F. E. SMITH.
ANGLE GAGE FOR SQUARES.
APPLICATION FILED JAN. 25, 1910. RENEWED DEC. 27, 1910.
1,001,316.
Patented Aug. 22, 1911.
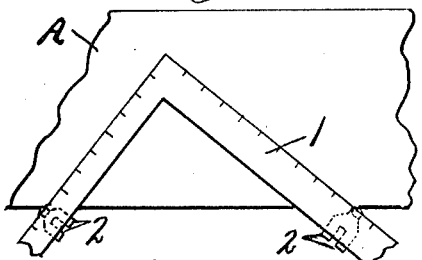
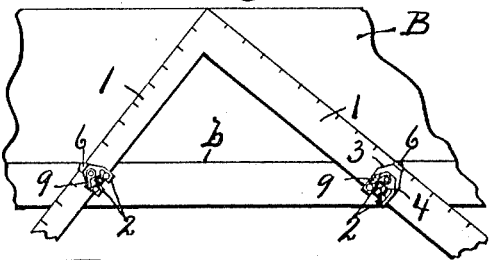
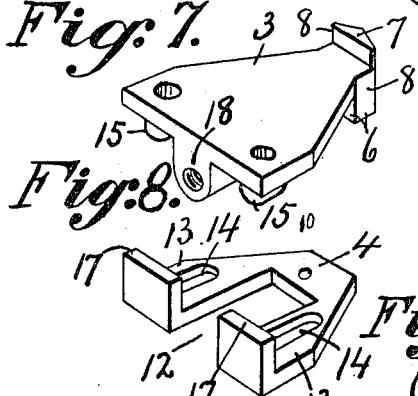
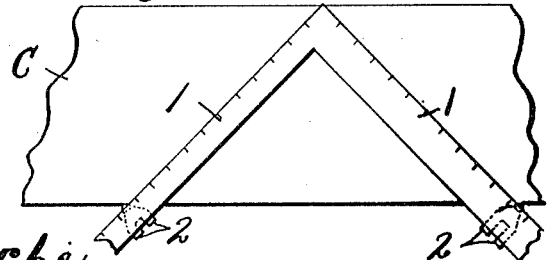
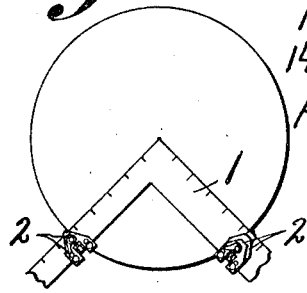
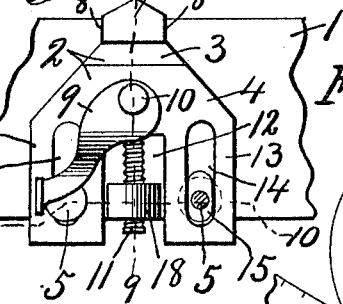
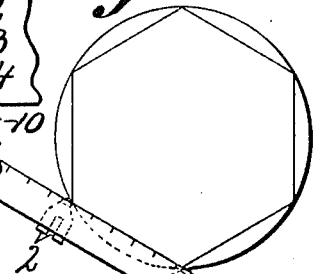
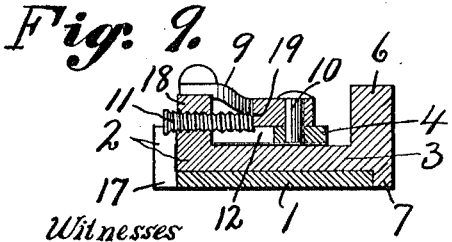
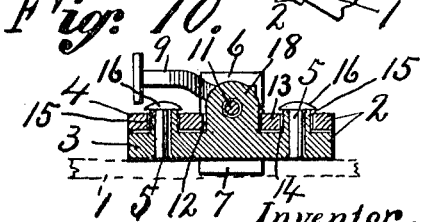
Witnesses
Edward J. Stout
H. E. Chase
Inventor
F. E. Smith
By
Howard P. Denison
Attorney

UNITED STATES PATENT OFFICE.

FRANK EDWARD SMITH, OF LESTERSHIRE, NEW YORK.

ANGLE-GAGE FOR SQUARES.

1,001,316.  Specification of Letters Patent.  Patented Aug. 22, 1911.

Application filed January 25, 1910, Serial No. 539,952. Renewed December 27, 1910. Serial No. 599,531.

*To all whom it may concern:*

Be it known that I, FRANK E. SMITH, of Lestershire, in the county of Broome, in the State of New York, have invented new and useful Improvements in Angle-Gages for Squares, of which the following, taken in connection with the accompanying drawings, is a full, clear, and exact description.

This invention relates to certain improvements in angle gages involving the use of an ordinary carpenter's square or other graduated bar and suitable gage members movable upon the square or bar along the graduations and adapted to be clamped thereto in any of their adjusted positions.

The primary object is to provide a simple and comparatively inexpensive sliding gage adapted to be clamped to either side of an ordinary steel square or graduated bar for laying off the angles of stair stringers, rafters and the like and also for laying out regular polygons or determining the centers of circles.

Another object is to provide each sliding gage with means by which it may be readily clamped to such square or bar and as readily removed therefrom when desired.

Other objects and uses will be brought out in the following description.

In the drawings: Figures 1, 2 and 3 represent my improved sliding gages as used in connection with an ordinary carpenter's square for laying out stair stringers as shown in Figs. 1 and 2 or rafters as shown in Fig. 3. Fig. 4 is a plan of the same device as used for obtaining the centers of circles. Fig. 5 is a top plan of the same device except that the sliding members may be used in connection with a straight graduated bar for laying off the sides of regular polygons. Fig. 6 is an enlarged top plan of one of the sliding gages and a portion of its supporting bar or square to which it is clamped. Figs. 7 and 8 are perspective views of the clamping plates of the sliding gage. Figs. 9 and 10 are sectional views taken respectively on lines 9—9, and 10—10, Fig. 6.

In Figs. 1 and 2 I have shown my improved gage as used for laying off the angles for the treads and risers of stair-case stringers —A— and —B—, said gage comprising an ordinary steel square —1— and sliding gage members —2— mounted on the arms of the square and movable along their respective graduations, Fig. 1 showing the method of laying out the stringers for open stair cases, while Fig. 2 shows the method of laying out the stringers of box stairs.

In Fig. 3 I have shown the same device as used for laying out the rafters, as —C—, in which case the sliding gage members —2— are clamped to the under side of the arms of the square.

The sliding gages —2— are identical in construction, each consisting of a pair of overlapping metal clamping plates —3— and —4— relatively movable one upon the other and held in operative relation by headed studs or rivets —5— to establish sliding interlocking connection between such plates thereby permitting such relative movement without liability of displacement.

The main bodies of the plates —3— and —4— which rest one upon the other are flat and comparatively thin and are tapered longitudinally toward one and the same end to an angle less than right angle so as to permit the points to be brought in close contact with the base line or edge of the article to be cut or measured, both plates being of substantially the same width.

The narrower end of the plate —3— is formed with raised bosses or shoulders —6— and —7— projecting from opposite faces of the main body and having their inner faces disposed at substantially right angles to the central lengthwise axis thereof, while their opposite side edges are parallel with such axis and constitute index faces —8— adapted to register with the graduations on the square —1— to indicate the distance of the sliding gage from a predetermined point, as the corner of the square. The boss or shoulder —6— forms a limiting stop for a swinging cam lever —9— which is pivoted at —10— to the plate —4— and coöperates with an adjusting screw —11— on the plate —3— to grip and release said plates upon and from the square or bar —1—, in a manner hereinafter described. The outer end faces of the bosses —6— and —7— are beveled to further facilitate the setting of the gages for laying out different angles of stair stringers and other objects. The shoulder —7— constitutes one of the gripping jaws for holding the sliding gage upon the square. The wider end of the plate —4— is bifurcated forming a central lengthwise slot —12— and opposite arms —13—.

The base of the plate —3— is provided with bosses —15— fitting in and projecting through the slots —14— some distance beyond the outer face of the plate —4— for guiding said plates in their relative movement one upon the other and forming seats for the heads, as —16—, of the rivets —5—, so that said rivets may be firmly tightened without liability of tightening the plates one upon the other. It is understood that the plate —3— is provided with rivet holes extending through the bosses —15— for the reception of the rivets.

The outer ends of the arms —13— are provided with shoulders —17— constituting gripping jaws opposite the jaw —7— for engaging the corresponding side of the edge of the square —1—, the depth of said jaw —17— being substantially equal to the combined thickness of the plate —3— and square —1—, so that the end faces of both jaws will lie substantially coincident with the face of the square opposite to that to which the sliding gage is applied.

The base, or wider end of the plate —3—, is provided with an additional boss or lug —18— projecting through the slot —12— and some distance beyond the outer face of the plate —4— and is provided with a threaded aperture engaged by the adjustable screw —11—. The length of the slot —12— is somewhat greater than that of the boss —18— so as to permit a limited lengthwise movement of the plates —3— and —4—, one upon the other.

The lever —9— is pivoted at —10— to the plate —4— at the end of the adjusting screw —11— and is provided with a cam face or eccentric portion —19— for engaging the inner end of the screw so that by rocking the lever upon its pivot —10— the plates —3— and —4— will be moved relatively to each other to grip the jaws —7— and —17— upon opposite edges of the square or bar —1—, the point of contact between the screw and cam being in a direct line through the axis of the screw and pivot —10— so as to hold the clamping plates in their adjusted position.

It is apparent from the foregoing description that the degree of opening between the jaws —7— and —17— may be varied by adjusting the screw —11— to adjust the sliding gages to different sizes of bars or to different portions of the square —1—, the symmetrical form of the sliding gages permitting them to be interchanged from one arm of the square to the other, or from side to side as may be desired or according to the work which it may be necessary to lay out.

In using this device for laying out the treads and risers of stair stringers, the gages are adjusted along the graduations of the square until the inner indicating face —8— of each member is registered with the desired graduation whereupon the sliding members are clamped in their adjusted position and the square laid upon the stringer with the indicating edges —8— registered with the ends of the cut to be made, that is with one edge of the stringer shown in Fig. 1 or with the base line —b— of the box stair stringer shown in Fig. 2.

When the device is used to lay out the angle of cut for rafters the sliding gages are usually placed upon the under side of the arms of the square and are adjusted to the desired graduations and clamped in place and then the square is placed upon the rafter with the points of the gages in contact with one edge of such rafter, as clearly shown in Fig. 3.

In using the device to ascertain the center of a log or other round body the gages are adjusted along the arms of the square to a distance from the corner corresponding to the radius of such body whereupon the square is laid against the circular end of the body with the inner index faces —8— of the gages registered with the periphery thereof, the corner of the square determining the center of such circle.

In laying off the sides of polygons, as shown in Fig. 5, the gages are adjusted and clamped upon the bar or square —1— with their inner index faces —8— spaced apart a distance corresponding to the side of the polygon which is to be described and by bringing such index faces into coincidence with the circumscribed circle, the ends of the sides may be consecutively marked out by simply shifting the bar with the gages thereon from point to point around the circle.

What I claim is:

1. A sliding gage for graduated bars, comprising two overlapping plates relatively movable one upon the other and each provided at its outer end with a jaw for engaging said bar, an adjusting screw on one of the plates, and a cam lever pivoted to the other plate and engaging one end of said screw for moving the plates endwise in opposite directions.

2. In combination with a bar, overlapping plates relatively movable one upon the other and provided with shoulders projecting from the same side thereof, one of the plates being provided with a central lengthwise slot opening from one end thereof, a cam lever pivoted to the slotted plate at the inner end of the slot, a lug on the other plate projecting into said slot and provided
5 with a threaded aperture, a screw engaging the threaded aperture and cam, and means for holding the plates in operative relation.

In witness whereof I have hereunto set my hand on this 17th day of January 1910.

FRANK EDWARD SMITH.

Witnesses:
J. S. BURROWS,
R. F. FULLER.

Copies of this patent may be obtained for five cents each, by addressing the "Commissioner of Patents, Washington, D. C."